(12) United States Patent
Smith et al.

(10) Patent No.: US 7,444,195 B2
(45) Date of Patent: Oct. 28, 2008

(54) SYSTEM AND METHOD FOR MORPHABLE MODEL DESIGN SPACE DEFINITION

(75) Inventors: Randall C. Smith, Rochester Hills, MI (US); Richard R. Pawlicki, Sterling Heights, MI (US); David R. Warn, Royal Oak, MI (US)

(73) Assignee: GM Global Technology Operation, Inc., Detroit, MI (US)

( * ) Notice: Subject to any disclaimer, the term of this patent is extended or adjusted under 35 U.S.C. 154(b) by 533 days.

(21) Appl. No.: 11/185,930

(22) Filed: Jul. 20, 2005

(65) Prior Publication Data

US 2006/0031057 A1 Feb. 9, 2006

Related U.S. Application Data

(60) Provisional application No. 60/598,290, filed on Aug. 3, 2004, provisional application No. 60/552,975, filed on Mar. 12, 2004.

(51) Int. Cl.
G06F 19/00 (2006.01)
(52) U.S. Cl. .......................... 700/97; 715/964; 345/420
(58) Field of Classification Search ............. 700/96–98, 700/182; 715/964; 703/2, 8; 345/418–420, 345/619
See application file for complete search history.

(56) References Cited

U.S. PATENT DOCUMENTS

| | | | | |
|---|---|---|---|---|
| 5,119,309 | A * | 6/1992 | Cavendish et al. | 700/182 |
| 5,905,501 | A * | 5/1999 | Kato | 345/420 |
| 5,923,573 | A * | 7/1999 | Hatanaka | 703/2 |
| 6,525,744 | B1 | 2/2003 | Poggio et al. | |
| 6,556,196 | B1 | 4/2003 | Blanz et al. | |
| 6,760,693 | B1 * | 7/2004 | Singh et al. | 703/8 |
| 6,898,560 | B1 * | 5/2005 | Das | 703/7 |
| 7,038,700 | B2 * | 5/2006 | Kawaguchi et al. | 345/646 |
| 7,275,023 | B2 * | 9/2007 | Chen et al. | 703/2 |
| 7,295,959 | B2 * | 11/2007 | Noma et al. | 703/8 |

OTHER PUBLICATIONS

V. Blanz et al., A Morphable Model for the Synthesis of 3D Faces, Proceedings Siggraph, 1999.
C. R. Shelton, Three-Dimensional Correspondence, A. I. Technical Report No. 1650, M.I.T. Artificial Intelligence Laboratory, 1998.
C. R. Shelton, Morphable Surface Models, International Journal of Computer Vision, 38(1), pp. 75-91, 2000.
Shenchang Eric Chen et al., Shape Averaging and its Applications to Industrial Design, IEEE Computer Graphics and Applications, vol. 9, Issue 1, pp. 47-54, Jan. 1989.
Brett Allen et al., The space of human body shapes: reconstruction and parameterization from range scans, ACM Transactions on Graphics, vol. 22, Issue 3, Proceedings of SIGGRAPH 2003, pp. 587-594, Aug. 2003.
Thomas Vetter, Michael J. Jones, Tomaso Poggio, "A Bootstrapping Algorithm for Learning Linear Models of Object Classes," CVPR '97 (IEEE Conference on Computer Vision and Pattern Recognition), pp. 40-46, Puerto Rico, 1997.

* cited by examiner

Primary Examiner—Alexander J Kosowski

(57) ABSTRACT

A method, system, and apparatus for preparing geometric models for use in a design tool are disclosed. The method comprises generating a first base shape model, separating the first base model into components, and characterizing the components. Further, the method provides for comparing the second base model, similarly prepared and characterized, to the first, and adjusting the features used to characterize the base model components until the two objects can be placed in correspondence. The system comprises a processor capable of processing instructions for generating base shape models wherein the processor is capable of processing instructions for separating a base model into components and further capable of processing instructions for characterizing base model components. Accordingly, the method may provide for defining a geometric model template by adjusting a base model to match a succession of input models.

20 Claims, 14 Drawing Sheets

SYSTEM AND METHOD FOR MORPHABLE MODEL DESIGN SPACE DEFINITION

CROSS REFERENCE TO RELATED APPLICATIONS

This application claims priority to U.S. Provisional Application No. 60/598,290, titled, "SYSTEM AND METHOD FOR GEOMETRIC SHAPE DESIGN," filed Aug. 3, 2004, which itself claims priority to U.S. Provisional Application Ser. No. 60/552,975, titled, "CAPTURING AND MANIPULATING AUTOMOTIVE DESIGN CHARACTERISTICS IN A STATISTICAL SHAPE MODEL," filed Mar. 12, 2004, both of which are incorporated by reference herein in their entirety.

TECHNICAL FIELD

A design tool for use in manufacture is disclosed. More particularly, this disclosure describes a computer-aided geometric shape design tool and process, method, apparatus and product for preparing exemplars therefore.

BACKGROUND OF THE INVENTION

Computer design tools useful for industrial design are most commonly "computer aided design" (CAD) based. Users of CAD programs often undergo training and have much experience in the use of CAD before their proficiency reaches a level high enough for complex design and engineering.

In the automotive industry, car body designers typically sketch their designs. Car body designers are creative artists who produce styling sketches and typically do not use CAD programs. From sketches and discussion with the car body designer, a CAD designer will rework the sketch onto the computer. Accordingly, the sketch is engineered into three-dimensional detail. There are often many instances of refinement discussed between the artist and CAD user. Oftentimes, for example, the designer's sketches are not in correct perspective and details may need to be added and changed, and therefore, the process to completion by a CAD user may become tedious and repetitive. The CAD tool requires construction of a shape, piece by piece. The overall shape may not emerge until a significant amount of work has been done.

It would be advantageous for a designer to have available a design tool that is simple to operate and can interactively create 3-dimensional shapes from direct manipulation or other inputs, and whose resultant design is captured in a computer file. Therefore, the time consuming step of refinement between the artist and a CAD designer may be substantially eliminated.

In automobile design, a designer often desires to keep the design within certain style parameters. For example, the task at hand for the designer may be to design a new CADILLAC. In this circumstance, it may be advantageous for the designer to have all available CADILLAC designs and then to change some aspect or another to create a new look in keeping with the brand character of the CADILLAC.

Alternatively, a designer may want to create a design that is intermediate between two designs, or is a blend of three or more designs. In any of these events, the process currently depends on the designer's strong familiarity with the various automobiles' designs. In this case, the ability to use a computer to maintain data on designs and morph automobile designs from any number of combinations would be particularly advantageous for the design process.

Complex design shapes such as automobiles may have topologies that vary greatly. The list of automobiles, even for just one automobile manufacturer, is extensive and the styling is diverse and includes many discrete variations. A computer based design tool that would allow a designer to combine any number of models to form a resultant new style or model would be advantageous.

Furthermore, it would be advantageous if the design tool visually offered to the artist a plurality of automobiles to choose from and provided the ability to combine them into a combined resultant automobile design. If the designer desires a sportier car, or, for example, a BUICK to be more CADILLAC-like, or to use the grill of one car on another car, it would be advantageous to provide in a design tool the flexibility to the user to reach their design goals or otherwise explore options.

Once a user has created a resultant combined design by combining as many models as desired, an additional benefit would come from the ability to change or morph that resultant design. A design tool that would be useful for independently varying base components of automobile designs is preferably flexible enough to allow a designer to explore different combinations and then provide the ability to morph the different combinations into many possible designs.

A collection or library of exemplars from which a user could choose exemplar models to combine with each other in accordance with above-described desirable design tool is desirable. Hereafter, this will be called a catalog. Exemplars having common points, curves, and/or other features to operatively match to produce a resultant mixed model is furthermore desirable.

SUMMARY OF THE INVENTION

In this disclosure a system, method, apparatus and product for preparing model exemplars is described. Elements of a mathematical description, such as in terms of curves, points or surfaces, or a combination of such with respect to a model's features, are used to enable correspondence of components and/or characteristics of the modeled object with components and/or characteristics of other objects of similar types. Such elements of a mathematical description as referred to hereinafter as describers. In one embodiment, a template of the model, or a portion thereof, having an initial layout may first be provided. Similar describers of a plurality of models are adjusted so that there is correspondence between describers of the models. The segmentation system, method, apparatus and product described herein provide user flexibility in describing geometric shapes so that they may be mixed or combined in subsequent operations.

Moreover, the segmented models are categorized as exemplars and are collected in a catalog for use in design tools for designing geometrically shaped objects.

Furthermore, on a display screen, exemplars are offered in the form of a catalog of exemplars. In a subsequent step a user may choose from the catalog a set of exemplars to mix or combine into a resultant design space that is described mathematically. The user then has the ability to explore that mathematical space and therefore to manipulate a resultant design. During this process of controlling the shape, output may be generated and in this way a new design may be created.

DESCRIPTION OF THE PREFERRED EMBODIMENT

A system, method, apparatus and product are provided for reducing, defining by describers, and putting into registration or correspondence the characteristics of 2-D as well as 3-D objects. Therefrom, a plurality of object characteristics may be mixed or combined in accordance with computer instructions to create a statistical model in a combined design space. The average of the mix is a resultant model that is displayed to a user on a display screen. The ability of the user to manipulate features in accordance with the describers of an object within and around the combined space allows for the user to explore the design space and potentially develop new designs and/or "cross-breeds." Accordingly, segmentation as described herein allows registration or correspondence of some or many object types including vehicles.

In an operation on segmented objects, a user can select models from different classes, groups, sets or individuals. The models have been fit so that particular curves, points or surfaces are numbered and are in correspondence with one another. For example, a plurality of classifications of vehicles may be described by the same number of describers. The number of degrees of freedom it might take to adequately describe a particular object may be determined by some adjustment and consideration of the particular object type by those of skill in the art of design of objects of the particular object type.

Figure 1:
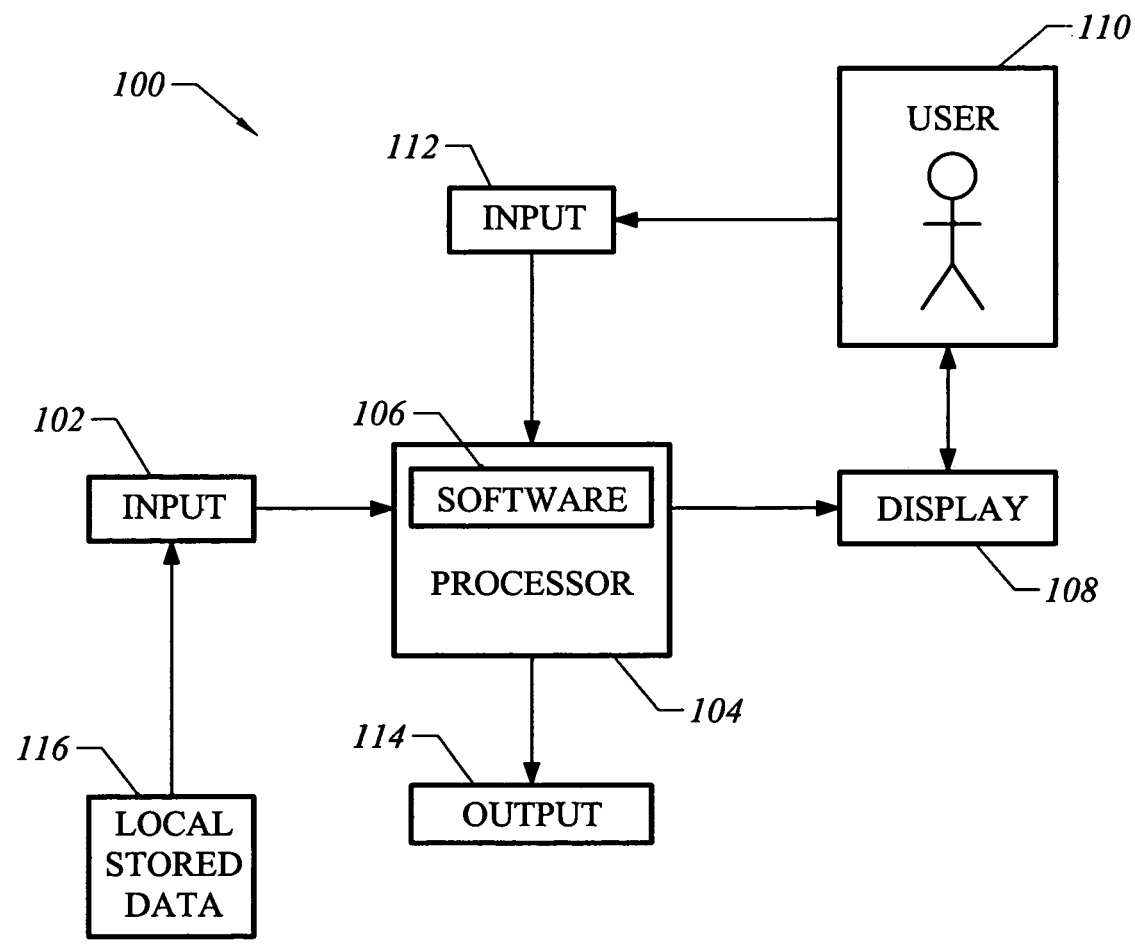
FIG. 1 is an apparatus and system diagram.

Models of complex geometric shapes, for example, those of automobiles, are made available to the apparatus and system as shown in FIG. 1. A user is provided 2-D or 3-D models in formats readable by the system and apparatus. The system and method, apparatus and product includes central system modules 100 as shown in FIG. 1 including, in one embodiment, an input module 102, a processor module 104 in communication with software instructions from software 106 (wherein the processor may be a plurality of processors and the software may be remote to the processor), a display module 108 to display operations to a user 110, and an apparatus. 112 for manual input such as a keyboard, touch-screen, voice recognition, joy stick, a mouse, and/or other apparatus for user input. The user 110 manipulates data that is processed by processor 104 according to computer instructions. Data may be shown on display 108 and/or generated as output to output module 114. It will be appreciated that there are many different configurations of a system and apparatus adaptable for the purpose of carrying out the methods described herein.

Described herein are a number of computer-implemented processes and apparatuses. Embodiments may be in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus. Computer program code is disclosed herein, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus. When implemented on a general-purpose microprocessor, the computer program code segments configure the microprocessor to create specific logic circuits.

Vehicles are a subset of objects and the two terms are used interchangeably herein. The number and type of vehicle classes included in a design space may determine a describer representation approach employed. For example, the type of describer, the number used, and the certain adjustments made to correlate segments is variable. The functional categories of automobiles for a single manufacturer may be broken down as coupes, sedans, SUVs, sports cars, and trucks. Secondary categories may include minivans, wagons and convertibles.

Figure 2:
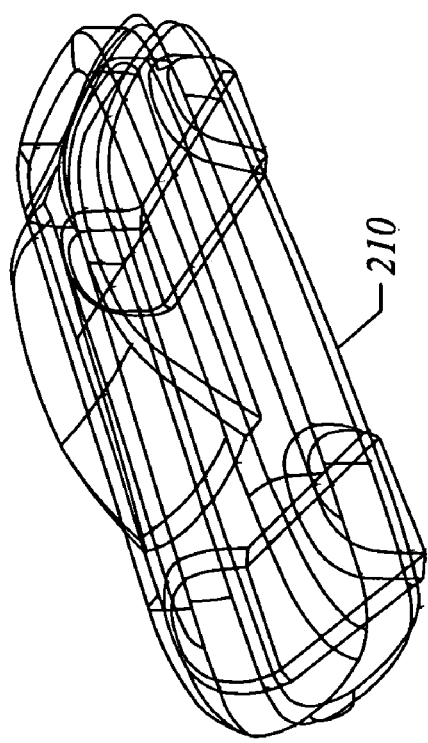
FIG. 2 is a detailed input model and a base model (shown as curves)
Figure 2:
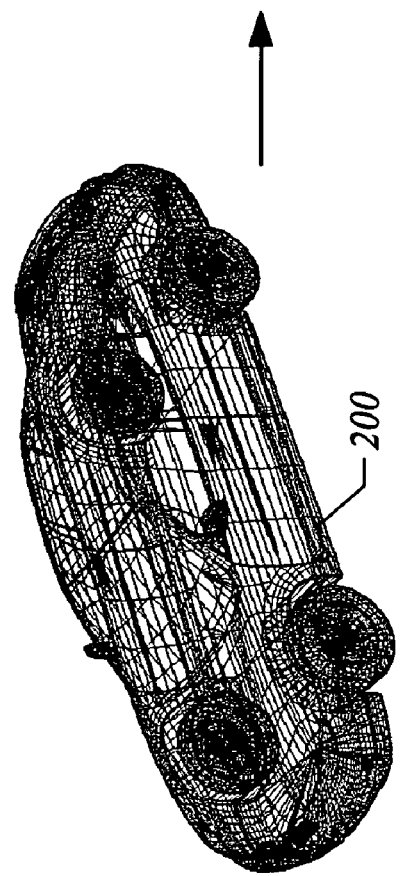
Figure 3:
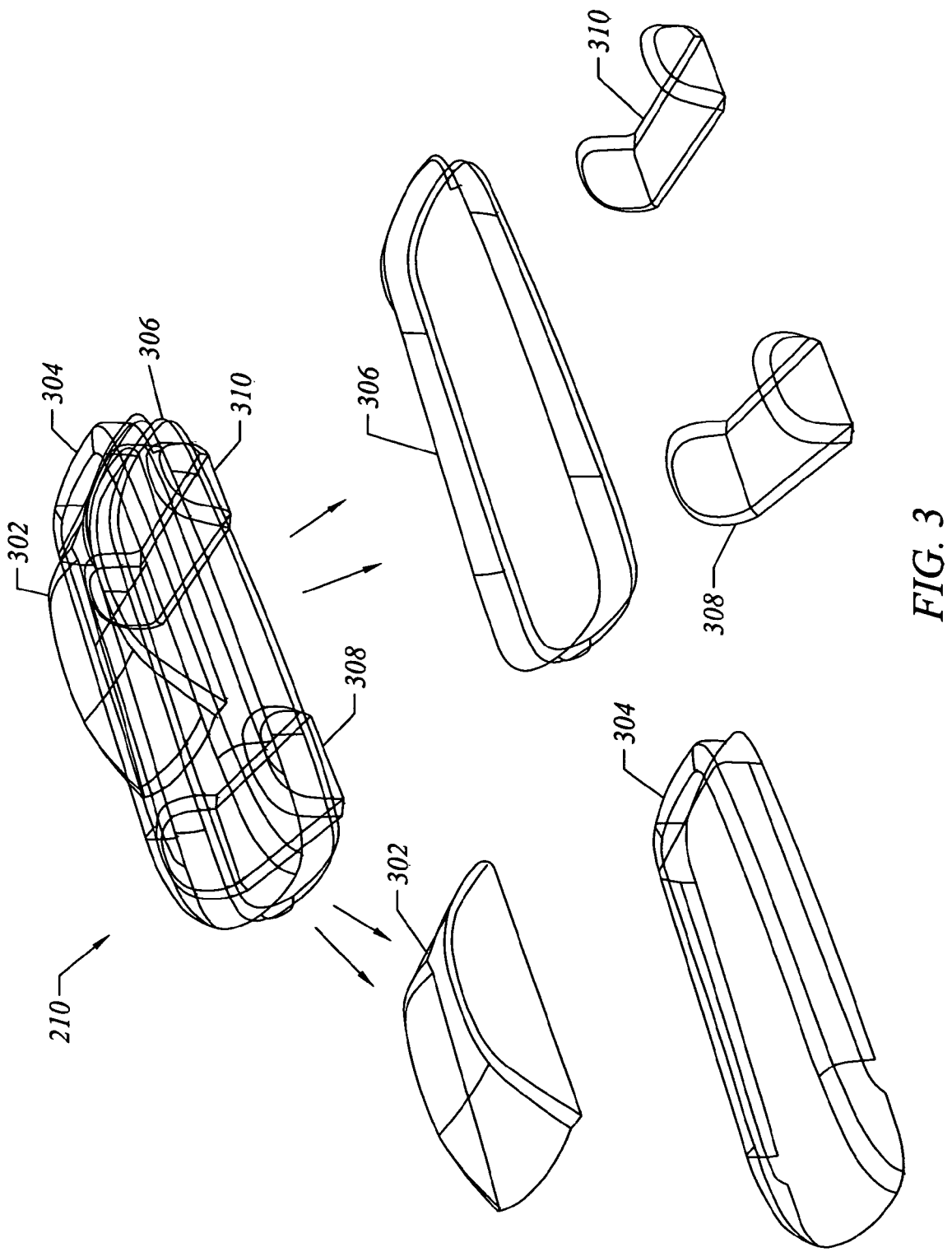
FIG. 3 shows base model broken into templates for each main component, or segment.

The segmentation process, method, apparatus and product include providing a detailed input model 200 as shown in FIG. 2. Model 200 may be simplified or reduced to base model 210 where its component parts can be separated, either manually and/or automatically. Turning to FIG. 3, a hierarchical break down into components of the base model 210 is shown as well as portions thereof including the greenhouse 302, the body 304, the underbody 306 and the wheelhouses 308 and 310.

The models shown in FIGS. 2 and 3 are three-dimensional. In three-dimensional models, body highlights may be identified. A highlight shows on a vehicle when the sun, or a directional light, is shining directly on it, with light rays perpendicular to the surface. This is especially important in surface areas with sharp bends, or where changes between surfaces occur. The proper lighting is preferably identified. The segmentation process described herein takes this information into account.

Similar considerations are taken in segmenting three-dimensional and two-dimensional models. To reduce the amount of computational time in mixing and morphing models, the surfaces and curves describe the base vehicle shape while common details are avoided or eliminated. In this reduction, detail features that deviate from the base or basic shape are preferably ignored, including moldings, bumper grooves, antennas, rear spoilers and outside mirrors. The curves of a base shape or a detail may be included in the common representation when there is corresponding curve information for most input vehicles. Other common details such as whether the car is 2-door or 4-door, may be added later while manipulating or morphing or during another stage of processing to enhance vehicle individuality.

Figure 4:
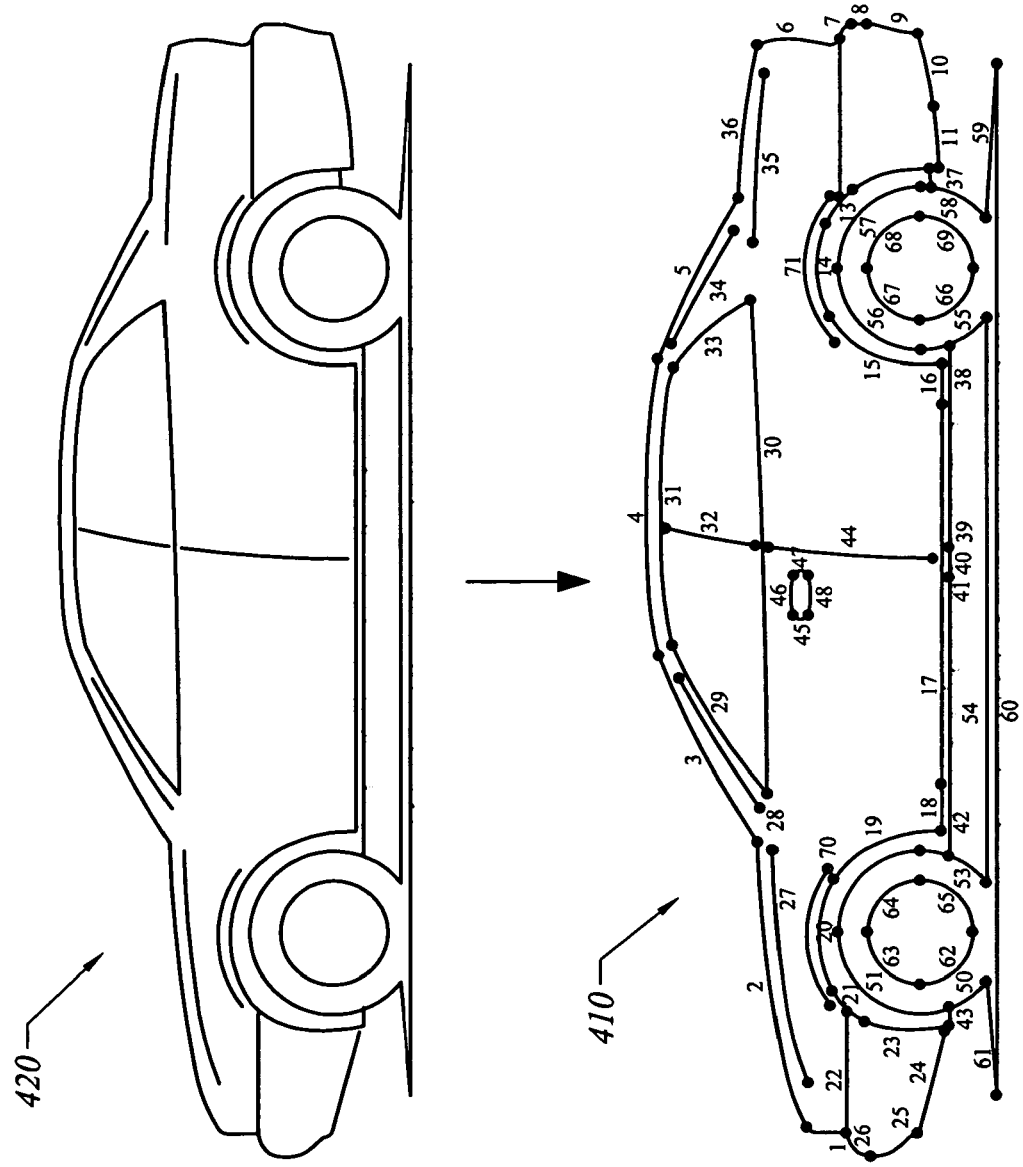
FIG. 4 shows a 2-dimensional segmentation of a base model.

FIG. 4 illustrates a 2D curve set and corresponding segment numbers of auto 410 for a vehicle profile 420. In this example, the segmentation contains seventy-one Bezier curves 1-71 that capture five different vehicle classes. Seventy-one curves were found to be sufficient to represent a wide variety of vehicle base shapes, but this number may change, depending on the objects. The curves may span components in the space occupied by any vehicle base shape. The intersections of the curves may be key feature points that are identifiable on the vehicle base shape. The curves may define the edges of a set of 2D outlines that are flexible, and are used to describe a variety of shapes for the components of the base shape segmentation. It will be appreciated that different types of describers are contemplated, such as various representations for points, curves, and surfaces, including NURBS, subdivision surfaces, Bezier curves and surfaces, and polygons as well.

While 71 curves provide a high dimensional space, in use, the simplified and segmented models are reduced to principal components by mappings described below. It will be appreciated that any suitable number of describers, in this case curves, may be used to describe portions or the whole of the subject shape.

Figure 5:
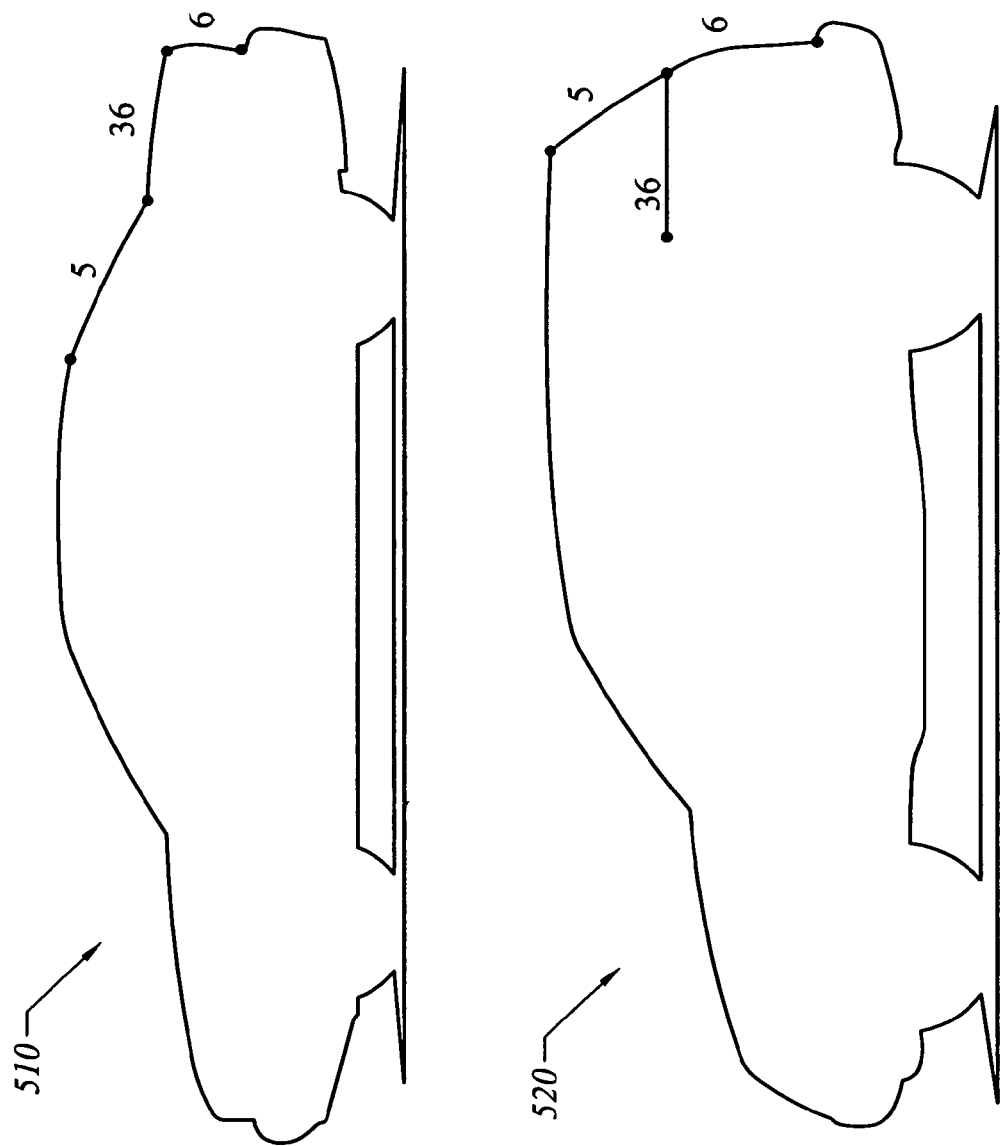
FIG. 5 illustrates variations in segmentation.

FIG. 5 illustrates how Bezier curves 5, 36 and 6 may describe two different vehicle classes that can be merged into one design space. As shown in FIG. 5, the first base model is a sedan 510 that has outline components and the second base model that is a hatchback-SUV 520 that has outline components and interior components. The method described herein includes an algorithm for correlating a first base model outline component 36 to a second base model interior component 36. More specifically, on hatchback type vehicles such as the SUV Saturn Vue 520, the trunk curve 36 is moved to the interior of the shape where it becomes part of the beltline. The same describer curve on the sedan BUICK CENTURY 510 is a silhouette curve. In the SUV curve 5 is connected either to curve 6 at its end, or is to slide along curve 36. Accordingly, different classes such as SUVs 520 and sedans 510 may be mixed.

The same curves as shown in FIG. 4 may be applied to more vehicles of the same or different classes by stretching and contracting them to shape them into a different vehicle. In the additional vehicles, the same number of surfaces or outline curves are provided. The curves of the additional vehicles substantially represent the same portions of the first vehicle. However, as shown in FIG. 5, curves may be strategically placed to compensate for deviations between classifications.

A situation may arise where the same number of curves for the first and then subsequent objects such as vehicles does not result. In this instance, the user of the segmentation method, system and apparatus described herein may make adjustments to the first object to either increase or decrease the number of describers, and then follow through a stretching operation again and until registration of the plural objects has been achieved.

Additional features may be further included as describers and incorporated into the model. Consumer response, aesthetics, brand identity and function may be represented. Numerical values to associate with these additional features can be determined by examining consumer databases, by calculating appropriate values from the describers, or soliciting opinions from experts. For example, consumer response may be represented numerically in the form of a consumer response score.

Figure 6:
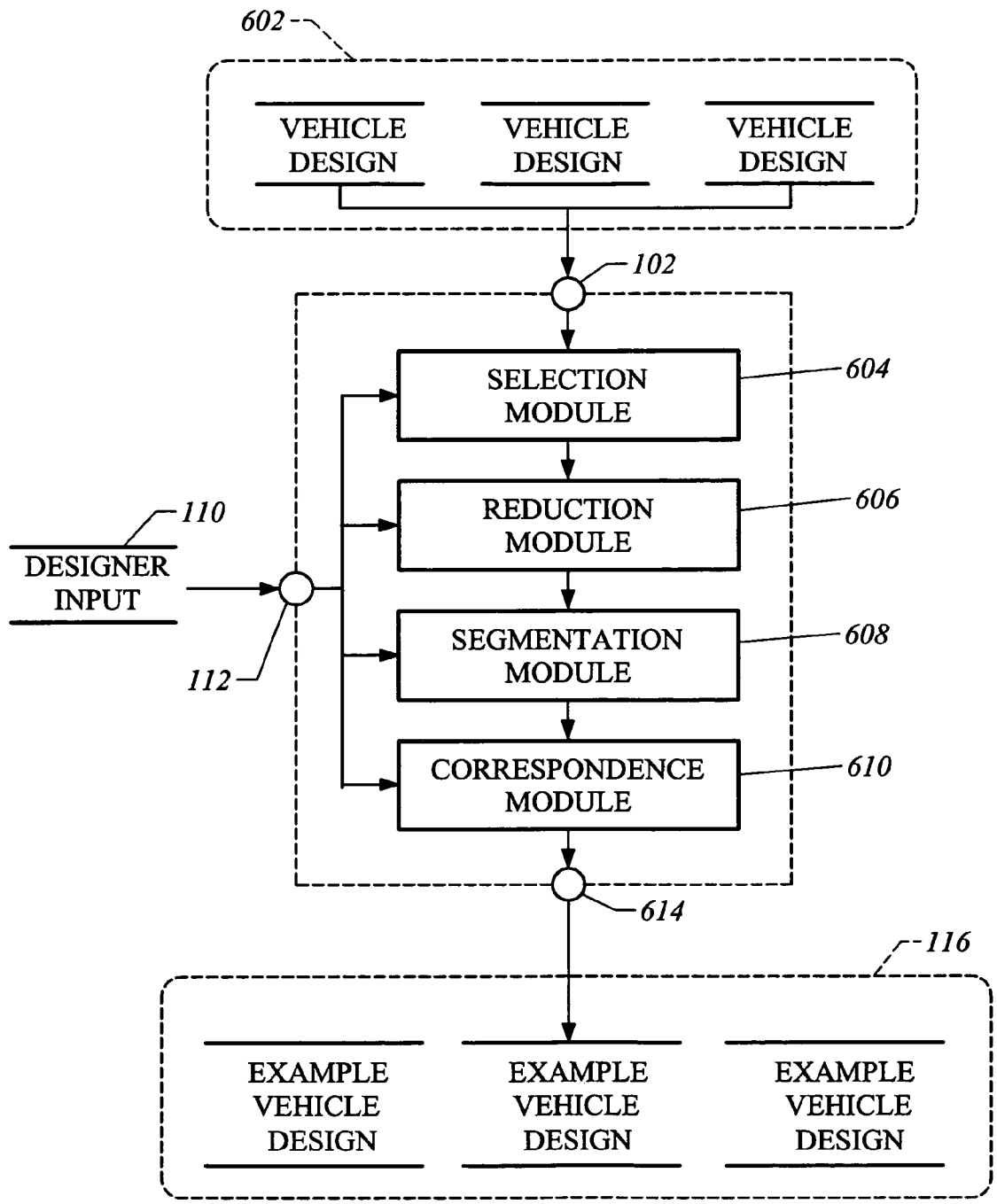
FIG. 6 is a system module chart.

The module chart of FIG. 6 illustrates a system embodiment. The vehicle designs are available as input models at database module 602. An input 112 is receptive of designer or user input 110 that is used by selection module 604 to allow the designer to choose a set of models from designs stored in a datastore 602. The designs may be input via data input 102.

Reduction module 606 inputs the selected designs and performs a reduction algorithm to remove details, transforming the selected designs into reduced designs. The process of matching geometric features in one input model to another is performed by matching the models to a reference model. The reference model may be the first base model generated. Since individual models vary significantly, and have features that are not common to others, the reference model will be defined as the base shape. Previously created CAD models, for example, may be simplified to a base model that contains components that are common across vehicles of interest.

Segmentation module 608 segments the reduced designs into component parts of the reference model as shown in FIGS. 3 and 4. The base model is segmented to aid the registration process of matching an input model to the reference model. Then, the designer can independently vary components of the body shape, thus increasing the flexibility of the subsequent shape creation and modification process. Base model segmentation may include, as described above but not limited to, components for a greenhouse, a body, an underbody and/or wheel areas.

Figure 7:
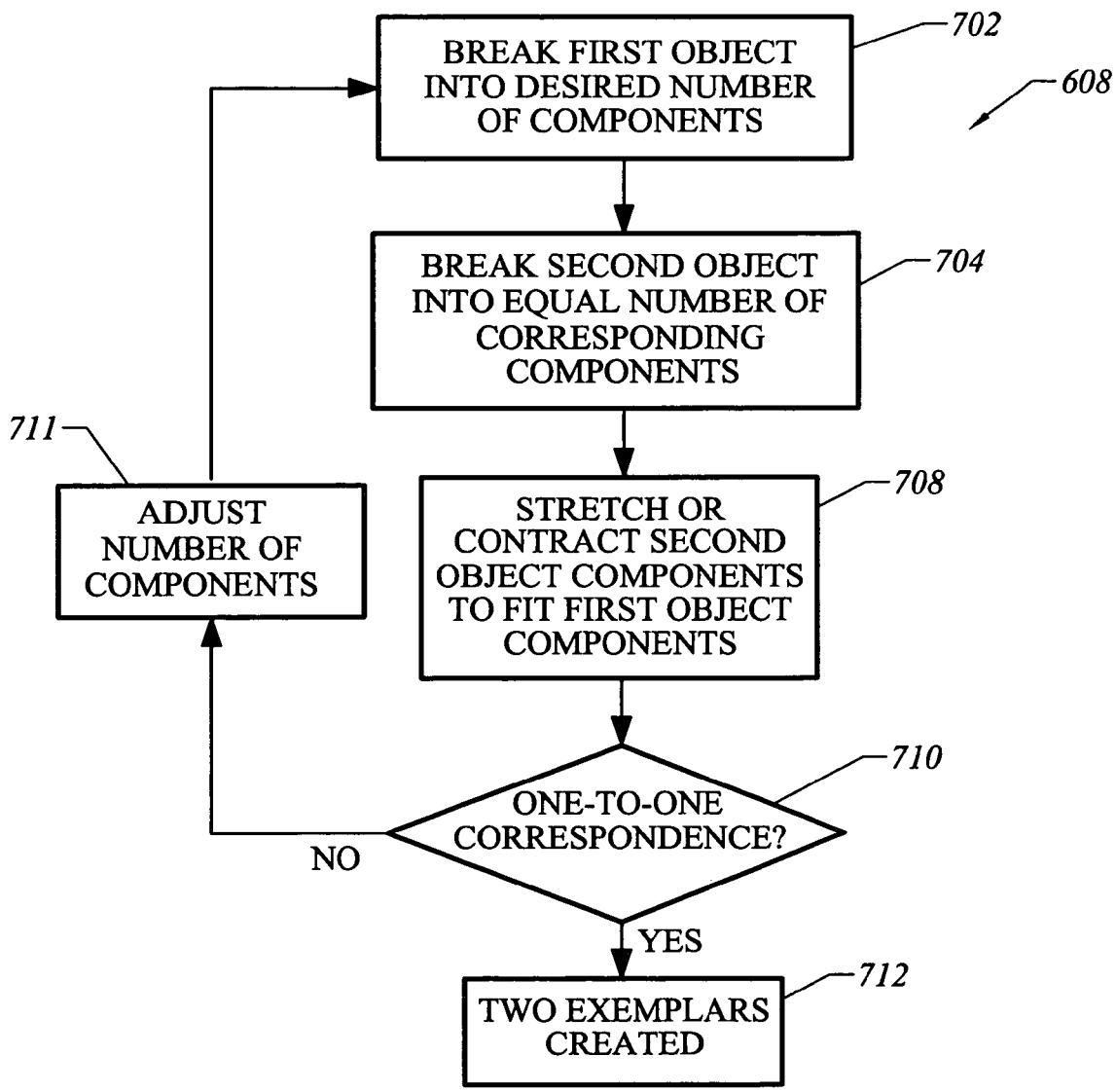
FIG. 7 illustrates steps of the segmentation process.
Figure 8:
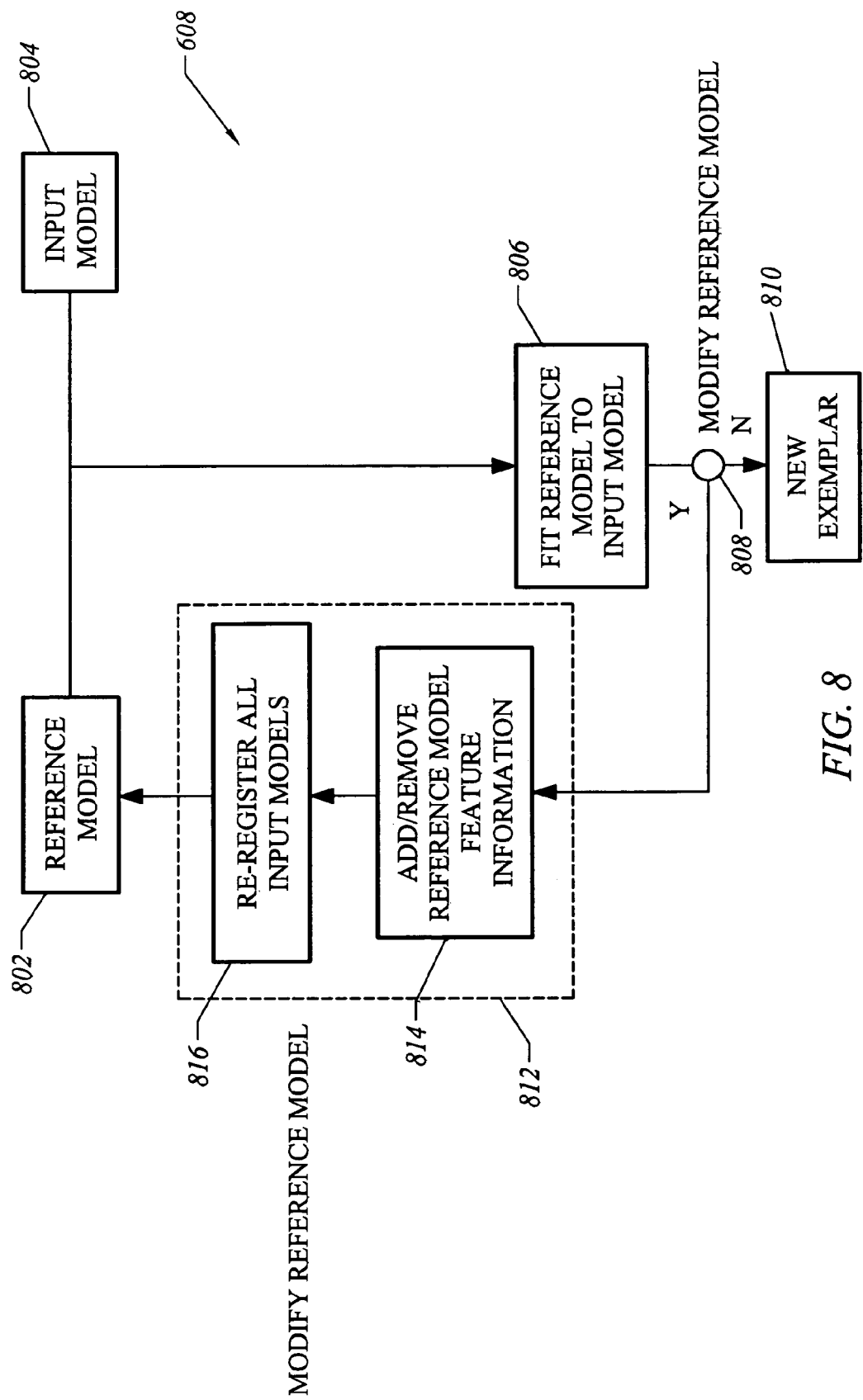
FIG. 8 illustrates steps of the segmentation process.

Turning to FIGS. 7 and 8 embodiments are provided for the segmentation process of module 608 of FIG. 6 as described so far. Other embodiments with different ordering or combinations of steps, including other steps and deleting some shown are also included in the technology described herein. In FIG. 7 a first object is broken down, separated or segmented into a desired or particular number of components at step 702. A similar action is taken with a second object at 704. Another step is to stretch or contract the describers of the second object to correspond to the first object's components in step 708. After these operations, there is a query 710 whether the objects correspond in a 1-to-1 correspondence. If not, then adjust number of components 711 and then step 702 may be repeated. If yes, the segmentation process for the first two objects has been completed at step 712 and they may be cataloged. This process may be continued to register further models.

In FIG. 8, a reference model is available 802 as a template for an input model 804. By stretching and/or contracting steps as described in connection with FIG. 7, the reference model may be adjusted to fit the input model at 806. A user may decide whether to modify the reference model at 808. If the fit is satisfactory—i.e., if the reference model and the input model can be put into 1-to-1 correspondence—then no modification of the reference model is done, and a new exemplar is available at 810.

However, if the fit is not satisfactory, the reference model is modified 812. At a step 814 reference model feature information may be added or removed. At a step 816 all input models previously registered to the reference model are re-registered to the modified reference model. The modified reference model becomes available again as a template at 802, and steps of FIG. 8 are repeated recursively with each new input model 804 until a new template or exemplar is available 810 from the model input at 804. Segmentation process 608 applies recursively and results in a new template 810 that may represent all the input models.

Returning to FIG. 6, correspondence module 610 positions points of the input vehicle model on points of the reference vehicle model. Key points in the reference model preferably are found in the input vehicle model. In an embodiment a network of curves is used to define the points of a reference vehicle. In another embodiment, the correspondence matching is performed serially per major segment. By reshaping the curves without moving the key points, most or all varieties of vehicle shapes can be created or matched. The curve network allows enough flexibility to define a variety of shapes. Once input vehicles are matched to the reference model, simplified input vehicle models, exemplars, are output at 814 and as a result are in correspondence at module 116.

Figure 9:
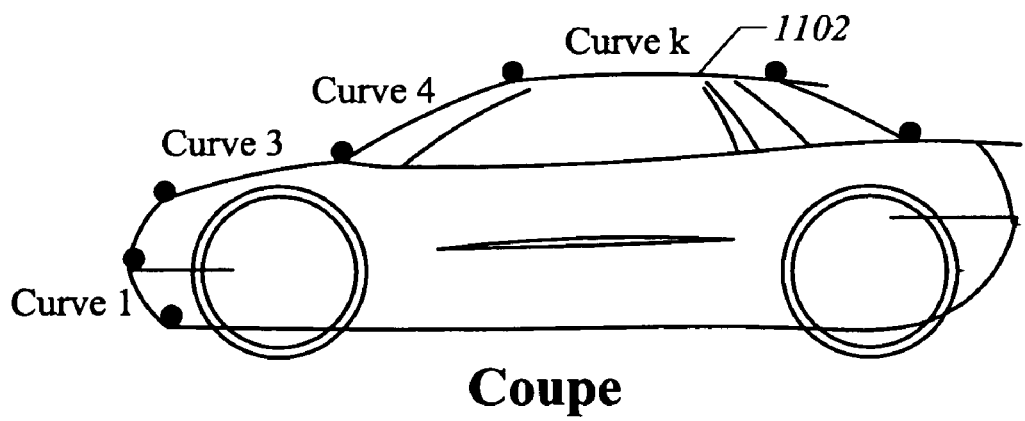
FIG. 9 illustrates a coupe and a truck with curves 1-k.
Figure 9:
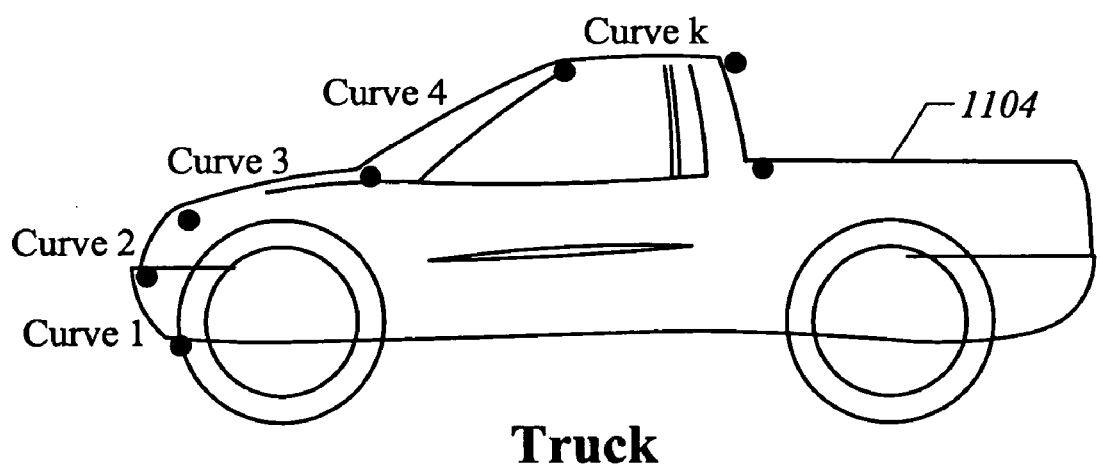
Figure 10:
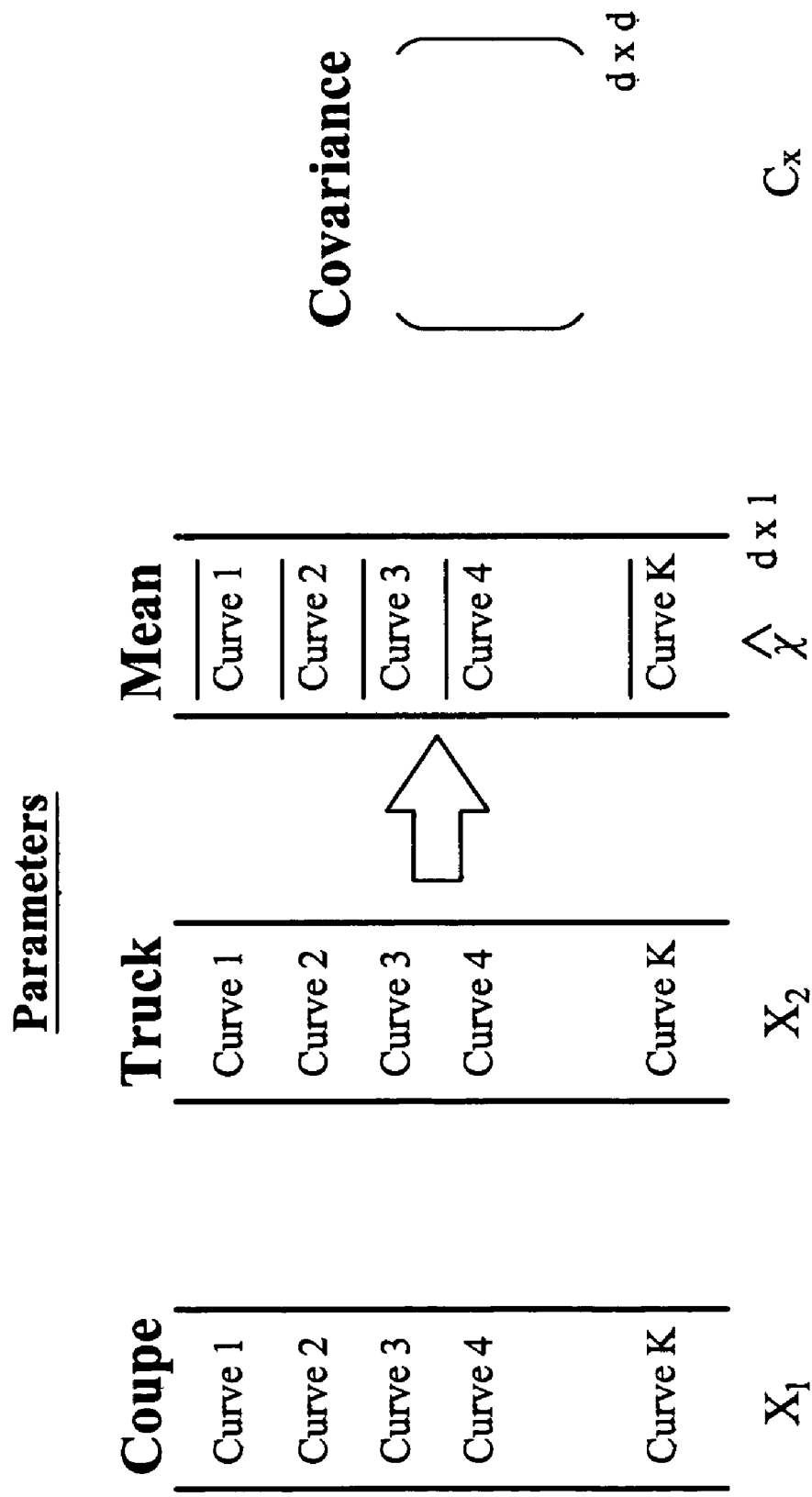
FIG. 10 shows how the curves 1-k of FIG. 9 are used in matrices and certain algorithmic steps.

FIG. 9 displays partially detailed outlines of a coupe 1102 and a truck 1104 that have features in correspondence. Corresponding curves in the coupe and truck outline may be different, but the correspondence module provides that they may be represented by the same curves, Curve 1 through Curve k. For example the coupe 1102 and truck 1104 may be used as exemplars chosen from the catalog to create a model design space. FIG. 10 shows the data flow from the vector parameters. By combining curves 1 on each vehicle, the average curve 1 results. When done for all the curves, the average vehicle results. Since the curves 1 through curve k are registered, the mean of the coupe and the truck curves may be the derived, and then the covariance matrix may be determined. These algorithmic steps carried out by the system and apparatus are performed to form the mix of vehicles suitable for morphing, alteration or manipulation as described below.

Figure 11:
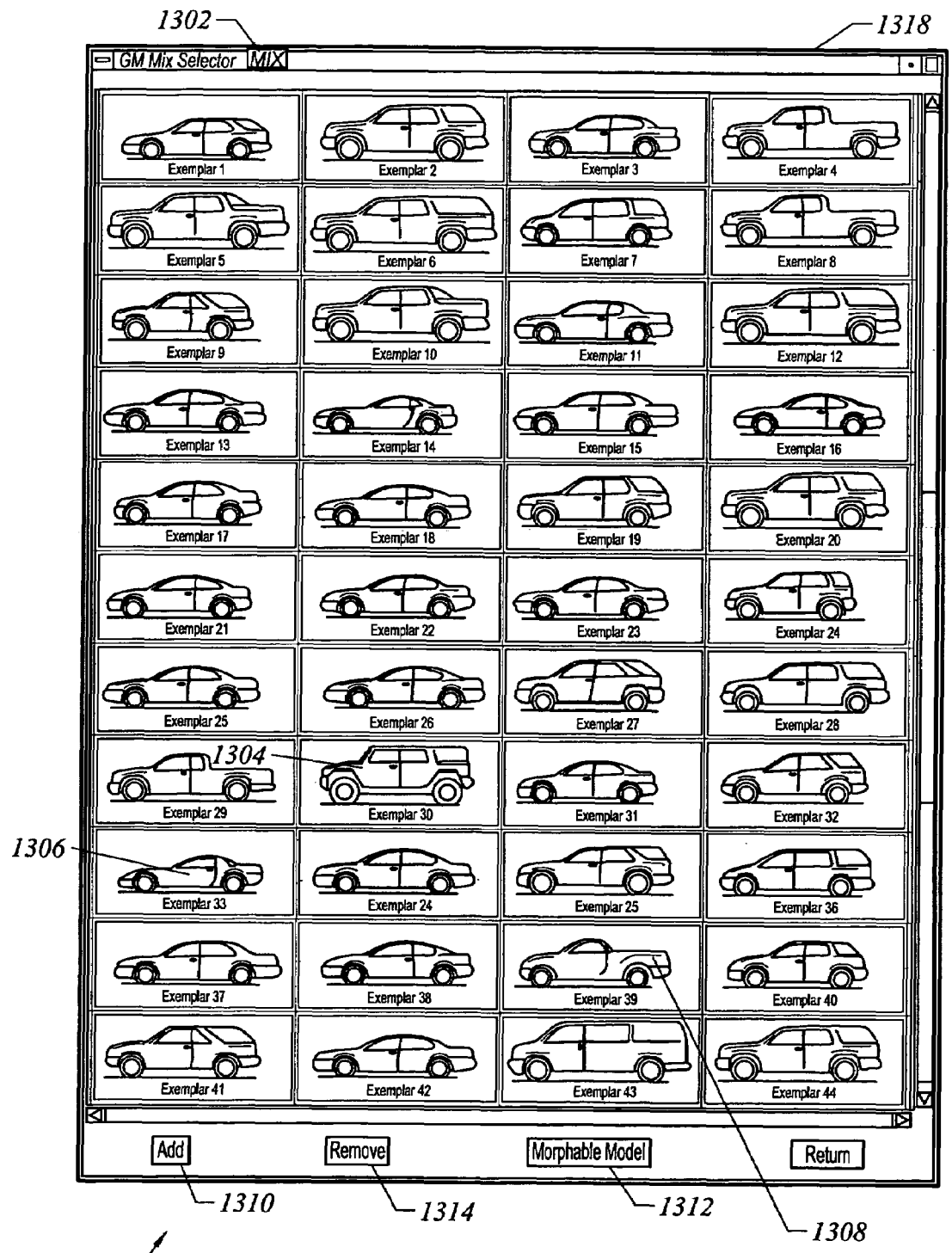
FIG. 11 depicts a screen shot of a catalog.

The user 110 may view on display screen 108 a variety of models in a catalog as shown in FIG. 11. The user may begin using the design tool by selecting a mix, or set of designs, from the catalog, to define and populate a mathematical design space.

Exemplars that correspond to existing models may inherently incorporate engineering constraints. Packaging and criteria information may be incorporated into the registered models cataloged in datastore 116 to assist in providing information early in the design process. Existing models used as input to the statistical model may already have well-coordinated packaging and aesthetic characteristics.

The design tool therefore provides the ability to manipulate or morph models in many ways. Features that are selectable for alteration, manipulation and morphing include primary criteria such as vehicle height, wheelbase, H-point, and steering wheel position.

Therefore, the catalog of FIG. 11 shown on display screen 108 advantageously provides to the designer exemplars to incorporate into a resultant object that may meet target design requirements.

There may be a style that the designer may want to emulate, e.g., a BUICK—having a particular brand flavor or identity that in this example should remain in the mix. Alternatively, favorite models may be mixed together and new design elements may be added. It will be appreciated that there are many ways to approach design including such considerations as aesthetics, brand identity, and function. Selectable morphable features include features named herein as well as others that may be recognized by persons skilled in the art of vehicle design.

In one embodiment, the user's interaction 110 with the system and method is driven by a user interface, the display 108 and manual input 112. Referring now to FIG. 11, on the display 108, the MIX button 1302 brings up the set of exemplars from which the user may choose. In general, this set of exemplars may be called a catalog. Here we refer to the drawing of the 2D data although in another embodiment, 3D data may also be used.

Returning again to FIG. 11, a smaller set is selected by the user from a larger set of exemplar vehicles, in this example including forty-four exemplars. Here, for example, a plurality of exemplars 1304, 1306 and 1308, are combined. On one or more screens there may be any number of exemplar options. Exemplars may be added to the mix 1310 or removed from the mix. In this way the user 110 can select particular exemplars to build a morphable model (via 1312). Selecting the mix provides a step that sets the initial probabilities and the initial mathematical space.

Under the ADD button 1410 there may be general categories in a drop down menu. Options that may be provided are, for example: processing all exemplars, processing only the cars, processing only the trucks, processing only the CHEVROLETs, or processing only the GMCs.

Similarly, one could also remove the items by the REMOVE button 1314. For example, all vehicles may be chosen and the CADILLACs removed. Accordingly, everything would then be in a selected set except the CADILLACs.

The exemplars in the catalog on display 108 have been through a registration process that may be automatic, semi-automatic or manual. Exemplars have been fit so that there is a one-to-one correspondence between them. For example, as shown in FIG. 9, a particular curve, the front piece of a hood on every car, is numbered 1, and another element is numbered 2. The registration is possible by the process of segmentation that includes knowledge by someone of ordinary skill in the art of design of how many degrees of freedom are needed to describe a particular car or other geometric shape and how one can correlate that same information to all of the cars in the catalog. Also, in setting up the process and method described herein, knowledge on the smooth flow of styling design is preferable. The result of segmentation is a set of features that can be put into 1-to-1 correspondence across the input models. From these models in correspondence, i.e., registered models, a statistical model can be produced that captures the similarities in character, style, shape and proportions of the mixed set.

The user 110 uses the interface driven by the MIX button 1302 to select exemplars and then build the morphable model 1312. As shown in FIG. 11, a user can select individual exemplars, such as a CORVETTE 1306, a HUMMER 1304 and an SSR 1308.

A morphable model is a statistical model derived from the exemplars chosen to populate the design space. Initially, by selecting a mix as described above, the initial probabilities and initial mathematical space were set. As shown in FIG. 10, an average or mean of these chosen cars is taken to represent the morphable model. The morphable model can advantageously be changed by the user in the manner that the user chooses. The user is able to drive the design tool's output to satisfy aesthetics, and impose functional and engineering constraints on the desired design. Once a morphable model is generated, the user can select a particular place, space, or feature to modify, for example, a windshield or a window. The segmentation provides the ability to pick a point or curve to modify, prior to mixing and after mixing.

Figure 13:
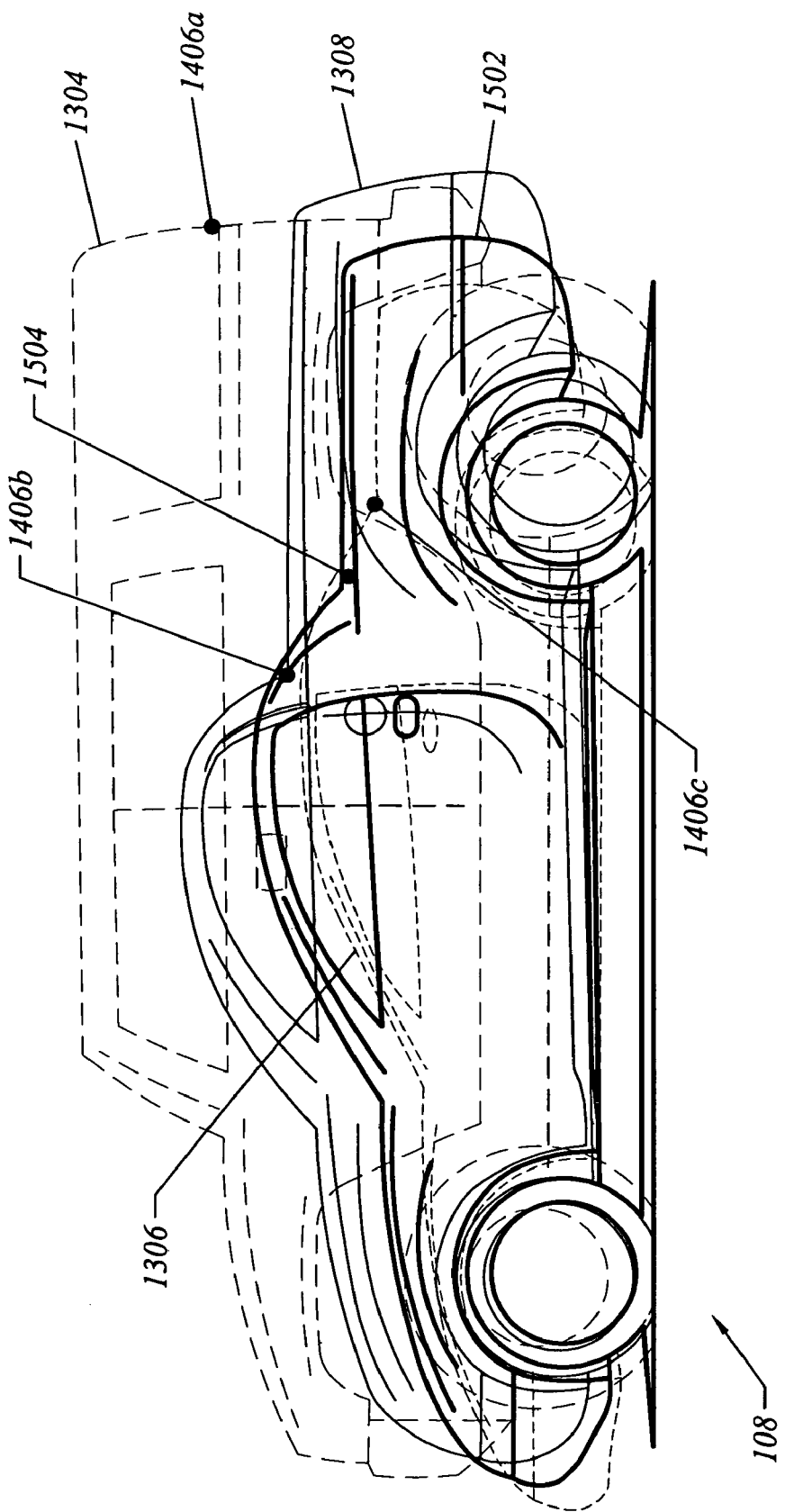
FIG. 13 depicts a morphed 2D model.
Figure 14:
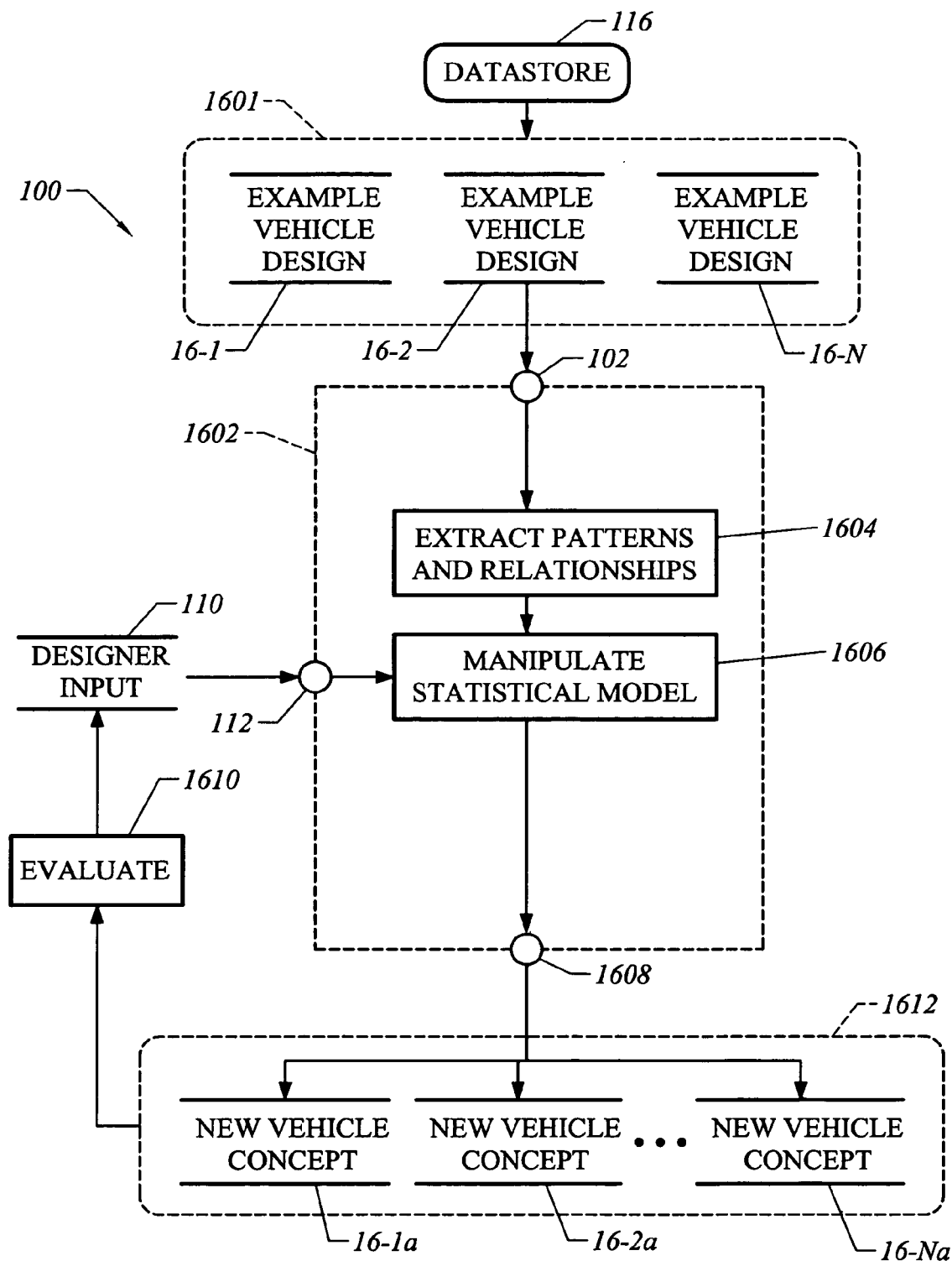
FIG. 14 is a process chart depicting an embodiment of a process in which segmented exemplars may be used.

As an example shown in FIGS. 13 and 14, a rear window is changed from the initial, average model to that of a morphed model. In this example of FIGS. 13 and 14, the user can click a point at the base of the rear window and move it to modify the shape.

Figure 12:
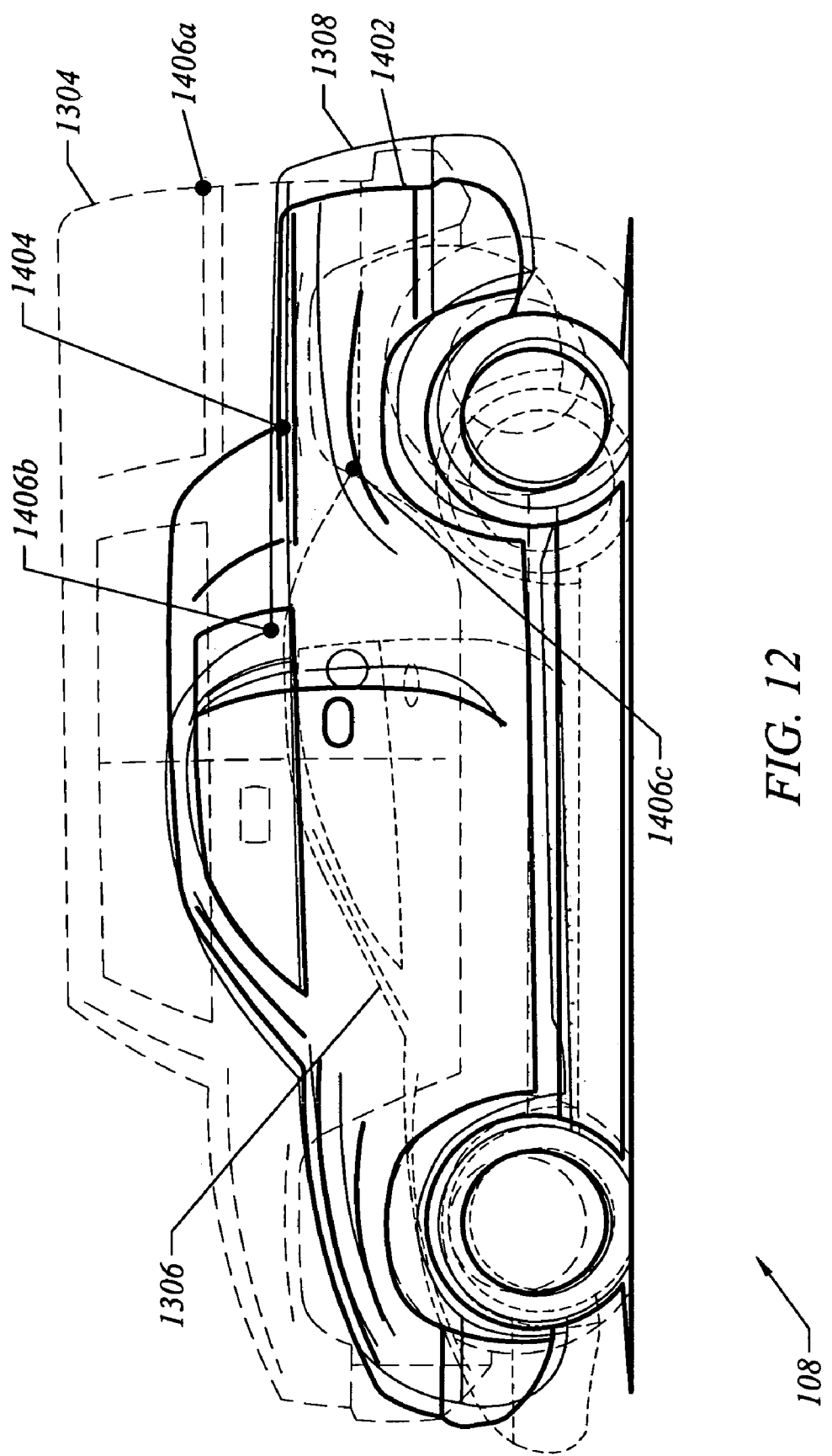
FIG. 12 depicts an average model generated by mixing 2D exemplars.

FIG. 12 shows a display screen 108 having a mix of a HUMMER H2 1304, the CHEVROLET SSR 1308, and the CHEVROLET CORVETTE 1306. The average of "curves 1" through "curves N" of the three vehicles 1402 is shown, representing the morphable model. In this way it is possible to combine different categories such as trucks, SUVs and cars together in a single representation.

On the display screen 108, the morphable model 1402 may be shown in one color for example and the exemplars may be in other colors behind the average model indicating the mixture. The designer may choose the colors.

For example, in FIG. 12, on the display 108, grayed out, the HUMMER and the CORVETTE, and the SSR, are displayed; their average 1402 may be displayed in black. The resultant average vehicle 1402 is approximately the size of the SSR.

In this example the user then may pick a point or a curve on the average vehicle to pursue changes to the morphable model. For example, the user may pick a point at the rear window 1404a. By selecting the rear glass to modify the user can move that point up to make the model more HUMMER like and move it down to make it more CORVETTE like. It may continue to include some of the character of the SSR.

A drop-down menu may provide a list of points and/or segmented curves for the designer to pick from to alter the resultant vehicle model. Or the user may simply click near or on the rear window to select the point 1404a. In the example, the point 1404a represents the rear window. By clicking the point 1404a, a cluster of points 1406a, 1406b and 1406c may be provided on the display 108. The cluster of points shows the space in which the mix of cars' rear windows reside. That is, the cluster of points gives the user an immediate indication as to the extent of the design space for that feature from the exemplars. The cluster may or may not be shown on the display but if shown may be used as a guide. In this way the user can drag the point 1404 to the position of 1504 in FIG. 13, knowing that he is still within the prescribed design space of the mixture.

The average vehicle model 1402 morphs into the morphed vehicle model 1502. As the point is dragged, or as any manipulating or morphing occurs, the morphing may show on the screen in a continuous interactive manner. From the registration process, all curves that are related to each other from the exemplars defining the design space change consistently together. Manipulating exterior vehicle curves will change the packaging curves and vice versa. This dynamic interaction of styling and packaging is available immediately to the designer to aid the aesthetic creation process. Alternatively, when the point is dragged, the morphed model 1502 may be visible when the mouse button is released.

Geometric design data, coded into a representation such that different, but related, designs may be put into correspondence, comprise the catalog of designs. The coding may, for example, entail segmenting each geometric design into points or vertices connected by curves. Some or all designs in the catalog may be represented as an array of values that characterize the vertices and curves for that design. Corresponding values in different arrays map to corresponding vertices and curves in different designs. On the other hand, one or more catalogs may be included.

In summary, a segmentation tool method and apparatus may be incorporated in or separate from the design tool system and apparatus previously described. FIG. 14 is a process chart depicting an embodiment of a process in which segmented exemplars may be used. The input 102 is receptive of a catalog 1318 (see FIG. 11) of plural registered vehicle designs 1601 individually marked as 16-1, 16-2, . . . , 16-n selected from datastore 116. Catalog 1318 contains simplified and segmented vehicle designs that are placed in correspondence by modules described in reference to FIG. 6. Modeling module 1602 receives selected designs 16-1, 16-2, . . . , 16-n of catalog 1318 of plural vehicle designs and captures and manipulates a derivable vehicle shape. Pattern and relationship extraction module 1604 of the modeling module 1602 extracts patterns and relationships from the plural vehicle designs to develop a general statistical model of a vehicle based on previous vehicle designs in catalog 1318. The general statistical model provides an infinite variety of derivable shapes 16-1a, 16-2a . . . 16-Na defined in terms of continuously variable parameters.

Manipulation module 1606 of the modeling module 1602 is adapted to allow a designer to manipulate the statistical model by applying designer selections 110 received from designer input 112, via e.g., a mouse, keyboard, touch-screen, or other user input device. Modeling module 1606 communicates the currently derived shape from the statistical model to the designer via output 1608. The shape may be stored in the datastore 116 and visually rendered to the designer on a display 108. The designer evaluates the derived shape at 1610, and may save the shape in datastore 1612 as a new vehicle concept. Multiple vehicle concepts may therefore be developed and employed in a vehicle design process.

Pattern and extraction module 1604 preferably performs dimensionality reduction on the covariance matrix $C_X$ of the statistical model to find salient features and reduce the dimensions of the feature space to a tractable size as illustrated in FIG. 10. Principle Component Analysis (PCA) is one technique that is suitable for performing the dimensionality reduction. As a result of PCA, a probability model is generated in a low-dimensional space that substantially improves computational efficiency yet provides mappings to the original feature space meaningful to the designer.

Manipulation module 1606 allows a vehicle designer to vary the patterns of the model in order to generate any number of concept vehicle designs. Based on designers' inputs 112 a statistical model is manipulated by a collection of mathematical techniques to yield designs. The reduction and segmentation described in detail above provides the initial input and subsequent output to the catalog 1318 for further manipulation as herein described.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for preparing a set of exemplars for use in a design tool, each exemplar in the set being registered to a common template model, said method comprising:
   registering each exemplar to the template model by the same set of points and features where the points and features define a describer;
   generating a first base model to be one of the exemplars;
   separating the first base model into separate components to form first base model components where the separate components are each defined by the describer and can be separately used to design a model; and
   characterizing the first base model components by the describer so that the first base model becomes part of the set of exemplars that have common features.

2. A method as recited in claim 1 further comprising:
   generating a second base model;
   separating the second base model into components to form second base model components; and
   characterizing the second base model components by a type of describer.

3. A method as recited in claim 2 further comprising:
   correlating the first base model components to the second base model components to form corresponding first and second base models exemplars.

4. A method as recited in claim 1 wherein the first base model components are described by curves.

5. A method as recited in claim 1 wherein the first base model components are described by points.

6. A method as recited in claim 3 wherein the first base model comprises outline components and the second base model comprises outline components and interior components, the method further comprising correlating a first base model outline component to a second base model interior component.

7. A method as recited in claim 3 further comprising stretching the components.

8. A method as recited in claim 3 further comprising contracting components.

9. A method as recited in claim 3 wherein the correlated first and second base model exemplars are input to a computer database to form a catalog.

10. A method as recited in claim 1 wherein the first base model is a vehicle.

11. A method as recited in claim 1 wherein the first base model is described by a plurality of Bezier curves.

12. An apparatus comprising:
a database module for storing model representations which comprise details, said database module including a plurality of exemplars where each exemplar in the plurality of exemplars is registered to a common template model by the same set of points and features where the points and features define a describer, wherein each of the exemplars includes separate exemplar components where each separate exemplar component is defined by the describer;
a selection module for choosing at least one of the model representations stored in the database module;
a simplification module for removing details from the selected model representation;
a segmentation module for describing the selected model representation with the describer.

13. An apparatus as recited in claim 12 wherein the describers are curves.

14. An apparatus as recited in claim 12 wherein the describers are points.

15. An apparatus as recited in claim 12 further comprising:
a correspondence module for providing that the describers of the first selected model representation and the describers of a second model representation are in correspondence with one another.

16. An apparatus as recited in claim 12 wherein the first selected model representation's describers refer to outline components and wherein the second selected model representation's describers refer to outline components and interior components, the correspondence module further for correlating a first selected model representation's outline component to a second selected model representation's interior component.

17. A system for preparing exemplars, comprising:
a processor processing instructions for generating a first base model, said processor including a database module for storing model representations which comprise details, said database module including a plurality of exemplars where each exemplar in the plurality of exemplars is registered to a common template model by the same set of points and features where the points and features define a describer, wherein each of the exemplars includes separate exemplar components where each separate exemplar component is defined by the describer, and wherein:
the processor processing instructions for separating the first base model into components to form first base model components; and
the processor processing instructions for characterizing the first base model components by a type of describer.

18. A system as recited in claim 17, wherein:
the processor is capable of processing instructions for generating a second base model;
the processor is capable of processing instructions for separating the second base model into components to form second base model components; and
the processor is capable of processing instructions for characterizing the second base model components by a type of describer.

19. A system as recited in claim 18 wherein:
the processor is capable of processing instructions for correlating the first base model components the second base model components to form corresponding first and second base models exemplars.

20. A system as recited in claim 19 wherein the first base model includes outline components and the second base model includes outline components and interior components, the processor further capable of processing instructions correlating a first base model's outline component to a second base model's interior component.

* * * * *